United States Patent [19]

Blair

[11] Patent Number: 4,911,466
[45] Date of Patent: Mar. 27, 1990

[54] CONSTANT CAMBER SUSPENSION

[76] Inventor: Alfred Blair, 19 Burnett Ave., Bayshore, N.Y. 11706

[21] Appl. No.: 356,764

[22] Filed: May 25, 1989

[51] Int. Cl.$^4$ .............................................. B62D 7/20
[52] U.S. Cl. ................................... 280/668; 280/691; 280/693; 280/696
[58] Field of Search ............... 280/668, 673, 675, 661, 280/690, 691, 692, 693, 695, 696, 701, 698

[56] References Cited

U.S. PATENT DOCUMENTS

| | | |
|---|---|---|
| 2,198,680 | 4/1940 | Slack . |
| 2,718,409 | 9/1955 | Kishline et al. . |
| 2,846,234 | 8/1958 | Steinkamp et al. . |
| 2,876,018 | 3/1959 | Kishline et al. . |
| 3,497,233 | 1/1970 | Belaski . |
| 4,159,128 | 6/1979 | Blaire . |
| 4,653,772 | 3/1987 | Sautter ................................ 280/696 |
| 4,842,297 | 6/1989 | Takahashi ........................... 280/691 |

Primary Examiner—Charles A. Marmor
Assistant Examiner—Karin Tyson
Attorney, Agent, or Firm—Leonard Belkin

[57] ABSTRACT

An automobile wheel suspension system which maintains the substantially vertical orientation of the wheel supporting strut during cornering of the vehicle or when a road hazard is encountered. The wheel suspension system utilizes a ball joint to connect the top of the vertically extending wheel strut to the body frame and a bell crank pivoted on the control arm supporting the wheel. The ball joint permits the body or chassis of the vehicle to tilt with respect to the strut while the bell crank maintains the orientation of the strut as the vehicle rolls or when the wheel makes contact with a bump in the pavement.

8 Claims, 2 Drawing Sheets

CONSTANT CAMBER SUSPENSION

BACKGROUND OF THE INVENTION

This invention relates to an independent wheel suspension system for vehicles and more particularly to a suspension system especially useful for passenger motor vehicles.

When an automobile is not moving, or is moving in a straight line, the tires are theoretically in a vertical position, with the tread flat on the surface of the pavement. When the vehicle goes into a turn, it tends to lean about its roll axis, which is an imaginary line running along the length of the car positioned at about axle height in the rear and close to the ground at the front. Weight is transferred to the outer wheels due to the effects of centrifugal force. The inside wheels take a drop in loading while the outside wheels take the increased loading.

In addition, with current suspension designs, the tires tend to depart from their vertical position, which is measured by camber. Camber is the angular measure of a tire's departure from the vertical and is considered negative if the tire leans inward toward the body at the top, positive if it leans outward at the top.

When a car makes a turn (i.e., corners) and the body rolls outwardly unless the suspension acts to compensate, it will be seen that with zero camber as defined above, the tires will depart from vertical with reduced tread or tire surface in contact with the road surface. With the outer wheels carrying the bulk of the load, it is quite apparent that this can under some circumstance be quite a dangerous situation.

A front end suspension system which has been developed to deal with this situation consists of nonparallel, laterally extending arms connected between the body of each wheel. This system is quite often referred to as the unequal-lengths A-arms due to the fact that the nonparallel arms are not equal in length and are A-shaped. This close to vertical during rolls and road irregularities which could effect camber. However, this suspension is expensive because of the number of parts involved, is not suitable for use with rear wheels, and requires more space between the body and the wheels resulting in a narrower span of the body for a given track dimension.

The so-called MacPherson strut was developed to deal with some of the limitations of the unequal-length A-arms suspension. Simply described, this strut involves the use of a simple lateral link and a long strut extending up to the unitized body structure, the strut including the coil spring and shock absorber. The MacPherson strut is considered a major improvement over earlier suspension systems and can readily be used with rear wheels as well but it is not quite as effective as the unequal-arm front suspension in obtaining proper wheel camber (that is, maintaining vertical tire orientation) during cornering of the vehicle and its consequent roll.

The following United States patents show a variety of wheel suspension systems currently known and/or in use: U.S. Pat. Nos. 2,198,680, 2,718,409, 2,846,234, 2,876,018, 3,497,233, 4,159,128, and 4,653,772. None of the preceding patents describes the present invention.

SUMMARY OF THE INVENTION

The present invention overcomes some of the problems and limitations of the MacPherson independent wheel suspension described above by insuring that the vertical orientation of the wheel supporting strut remains stable or substantially unaltered during cornering or when an obstacle is encountered.

In accordance with a preferred embodiment of this invention there is provided a wheel suspension system utilizing a ball joint to connect the top of the vertically extending wheel strut to the body frame and a bell crank pivoted on the control arm supporting the wheel. The ball joint permits the body or chassis of the vehicle to tilt with respect to the strut while the bell crank maintains the orientation of the strut as the vehicle rolls or when the wheel makes contact with an obstacle in the pavement.

It is thus a principal object of this invention to provide an improved wheel suspension system that maintains the orientation of the wheel during cornering and other conditions.

Other objects and advantages of this invention will hereinafter become more evident from the following description of a preferred embodiment of this invention.

DETAILED DESCRIPTION OF THE PREFERRED EMBODIMENT

Figure 1:
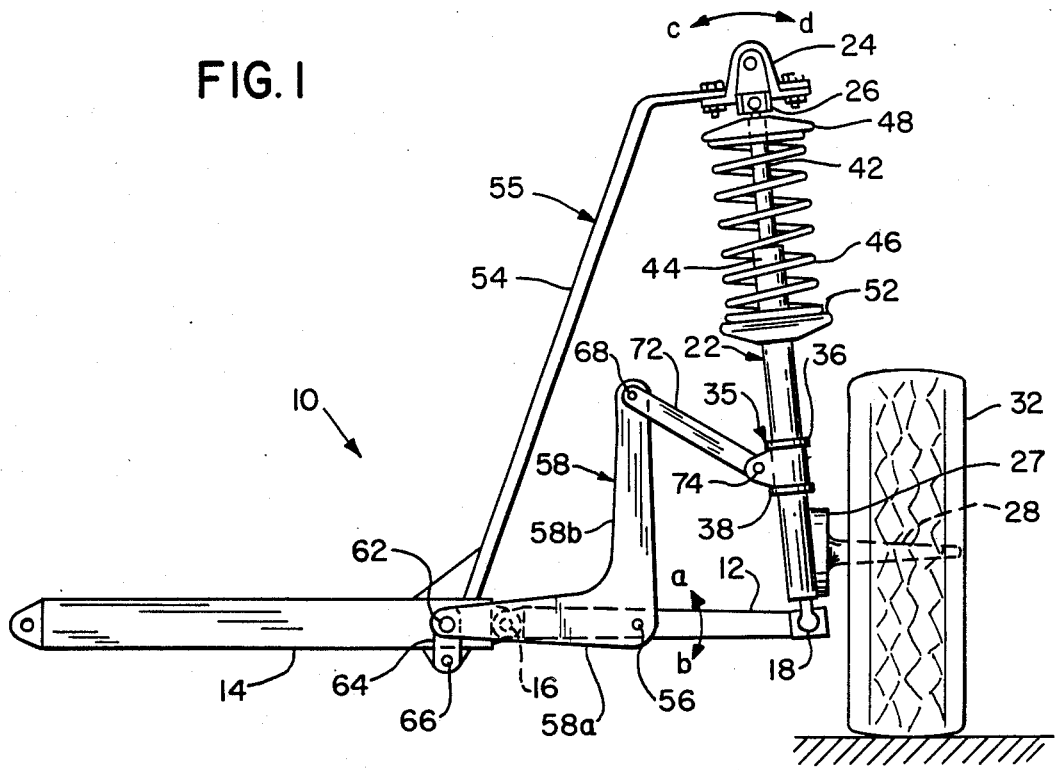
FIG. 1 is a partially schematic, frontal elevational view of a wheel suspension in accordance with a preferred embodiment of this invention.
Figure 2:
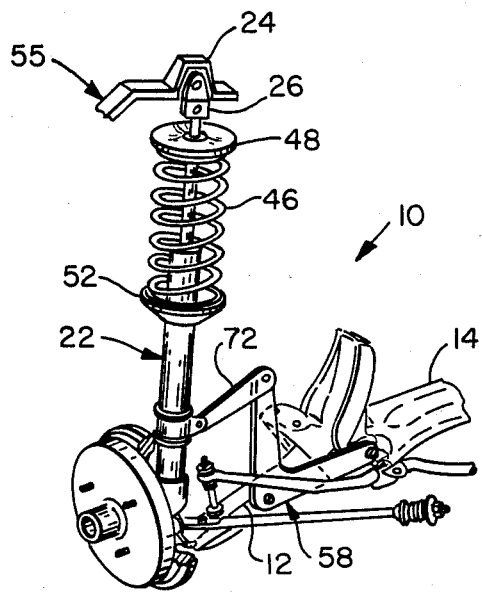
FIG. 2 is a partially schematic, isometric view of the wheel suspension shown in FIG. 1.

Referring to FIGS. 1 and 2, there is illustrated a front wheel suspension 10 comprising a support arm 12 pivotally mounted at one end to body suspension member 14 by a pin 16 for vertical movement of arm 12 as shown by the double headed arrow a-b around pin 16.

On the free end of arm 12 is mounted a ball joint 18 through which is attached the lower end of strut 22 which extends up almost or substantially vertically. By almost or substantially vertically extending herein is meant that the strut is predominantly on a vertical orientation.

The upper end of strut 22 is attached to body 24 of the vehicle through a ball joint 26 which allows body 24 to rotate with respect to strut 22 in all directions as shown by double headed arrow c-d.

Strut 22 supports a member 27 which carries axle 28 for wheel 32. Also mounted on strut 22 is a collar 35 which is prevented from moving along the length of strut 22 by a pair of stops 36 and 38 mounted on strut 22. A bushing (not shown) would be provided within collar 35 to facilitate the rotation of strut 22 for steering.

The upper portion of strut 22 comprises a piston rod 42 riding within the tubular part 44 forming a shock absorber and terminating at its opposite end in ball joint 26. A spring 46 is mounted between stops 48 and 52 mounted on piston rod 42 and tubular part 44, respectively.

It is understood that the vehicle in which suspension 10 is incorporated is of common design in which body 24 and body suspension member 14 are integral with each other and for this purpose may be represented by a connecting body member 54, forming a vehicle body 55. Body 24, member 14 and member 54 forming vehicle body 55 would rotate together about ball joint 26 as shown by double headed arrow c-d.

At some intermediate point along the length of support arm 12 is located a pin 56 which supports pivotally the elbow of a bell crank 58. The bottom leg 58a terminates with a pin 62 to which is pivotally attached one end of a short link 64 the other end of which is pivotally mounted on body suspension member 14 through a pin 66.

Upper leg 58b of bell crank 58 terminates with a pin 68 to which is pivotally attached one end of a strut link 72 the other end of which is pivotally attached by way of a pin 74 to collar 35 as illustrated.

Figure 3:
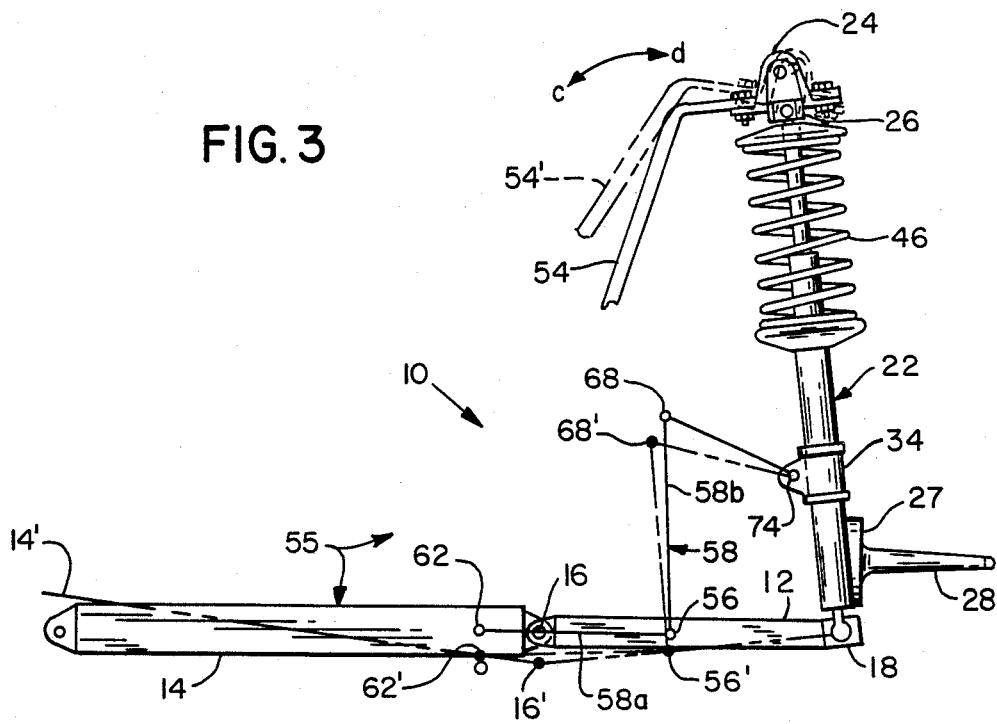
FIG. 3 is a view similar to that of FIG. 1 illustrating the action of the wheel suspension during a roll.

For an illustration of how suspension system 10 maintains the position of strut 22 and hence wheel 32 during a body roll, reference is made to FIG. 3, where body 55 is shown rolling clockwise as indicated by arrowhead d. Movement of the various parts is shown in broken lines. Pin 16 drops down a particular distance to a new position 16' while pin 56 supporting the heel of bell crank 58 drops down a fraction of that distance to a new position 56', while pin 62 supporting the free end of leg 58a of crank 58 drops somewhat less than the distance traversed by pin 16 to a new position 62' with the result that bell crank 58 not only drops but also rotates counterclockwise. Pin 68 effectively rotates circularly around pin 74 on collar 35 to a new position 68' with the consequence that strut 22 virtually remains unchanged in its vertical position. It will be noted that ball joint 26 at the top of strut 22 permits body 24 to rotate around the upper portion of strut 22 thereby not exerting a translational force on strut 22.

Figure 4:
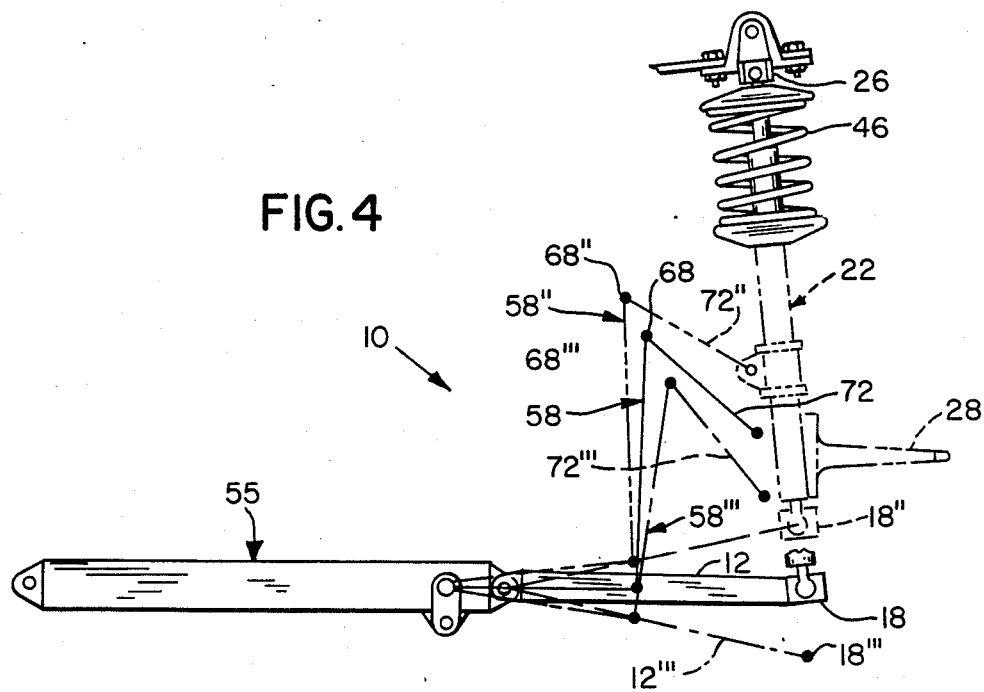
FIG. 4 is a view similar to that of FIG. 1 illustrating the action of the wheel suspension during a bump and a pot hole.

To illustrate the operation of wheel suspension 10 when wheel 32 hits an obstacle or drops into a pothole, reference is made to FIG. 4. When wheel 32 (axle 28) rises sharply because of a bump, strut 22 assumes the position shown by numeral 22 compressing spring 46, bell crank 58 rises and rotates counterclockwise to a new position shown by numeral 58" so that link 72 assumes the position shown by numeral 72". It will be noted that while strut 22 does rise along with wheel 32, the vertical orientation of strut 22 remains substantially unchanged.

In a similar fashion, should wheel 32 drop into a rut, bell crank 58 will assume the position shown by numeral 58''', and link 72 will assume the position shown by numeral 72'''. There again it will be seen that the orientation of strut 22 is largely unaffected by the movements of wheel 32 just described.

It has been noted that collar 35 is mounted on strut 22 to permit the latter to rotate with respect to the former. This arrangement permits suspension 10 to be employed with the front wheels to permit strut 22 to turn for steering, or, in a four wheel steered vehicle, the rear wheels as well. For rear, non-steerable wheels, it may still be desirable to employ collars with some degree of rotational movement, if desired, or collar 35 may be designed not to have that type of action.

It will be seen from the preferred embodiment of this invention described above, it is possible to utilize modern wheel suspension designs in such a way as to avoid or minimize the adverse effects of a roll or contacts made with bumps or ruts in the pavement on the position of the wheel struts of the vehicle. This should bring increased safety to the operation of high performance vehicles and provide an additional margin of safety during normal operation of a vehicle during an emergency accident avoidance situation or where unexpected obstacles appear on the road under high speed, cruising conditions.

While only a preferred embodiment of this invention has been described it is understood that many variations thereof are possible without departing from the principles of this invention as defined in the claims which follow.

What is claimed is:

1. An independent wheel suspension for a motor vehicle having a body comprising:
    a. almost or substantially vertically extending strut means for supporting a portion of said body and carrying a wheel axle;
    b. joint means connecting the top of said strut means to said body permitting said body to pivot in any direction about the top of said strut means, said strut means including spring means for permitting said strut means to extend and contract to permit said wheel axle to flex vertically with respect to said body;
    c. substantially horizontally extending support arm means pivotally connected at one end to said body and pivotally connected at its other end to the bottom of said strut means for supporting the bottom of said strut means;
    d. bell crank means having a pair of arms connected to each other at one end each to form an elbow;
    e. said elbow pivotally mounted on said support arm with a first arm extending generally upwardly and a second arm extending generally in a horizontal direction;
    f. collar means mounted on said strut means against movement along the length of said strut means;
    g. link means pivotally mounted at one end to said collar means for vertical rotation;
    h. the other end of said link means pivotally connected to the free end of said first arm of said bell crank means;
    i. joining means pivotally connecting the free end of said second arm of said bell crank means to said body for vertical rotation of said second arm about said body and limited translation motion with respect to said body, whereby said bell crank means will maintain said strut means substantially unchanged in its vertical orientation during roll of said body or sudden vertical movement of said wheel axle as a result of a road hazard.

2. The wheel suspension of claim 1 wherein said strut means is rotatable with respect to said collar means to permit the strut means to turn for steering of said vehicle.

3. The wheel suspension of claim 1 wherein said joining means comprises a predominantly vertically extending link having one end pivotally connected to said body and the other end pivotally connected to the free end of said second arm of said bell crank means.

4. In an independent wheel suspension for a motor vehicle having a body comprising almost or substantially vertically extending strut means for supporting a portion of said body and carrying a wheel axle; joint means connecting the top of said strut means to said body, said strut means including spring means for permitting said strut means to extend and contract to permit said wheel axle to flex vertically with respect to said body; substantially horizontally extending support arm means pivotally connected at one end to said body and pivotally connected at its other end to the bottom of said strut means for supporting the bottom of said strut means, the improvement comprising, said joint means comprising a ball joint means connecting the top of said strut means to said body to permit relative rotation in all directions, and bell crank means pivotally mounted on said support means and having one end pivotally connected to the strut means and another end pivotally connected to the body to maintain said strut means in substantially an unchanged vertically extending position during roll of said body and sudden vertical movement of said wheel axle as a result of a road hazard.

5. The wheel suspension of claim 4 wherein said bell crank means comprises a pair of extended arms integrally connected to each other at one end, said strut means including collar means mounted thereon against movement along the length of said strut means, and link means connecting the free end of one arm of said crank means to said collar means, said link means being pivotally connected at both ends.

6. The wheel suspension of claim 5 having joining means for connecting the free end of the second arm to said body to permit limited horizontal movement of said bell crank means with respect to said body and vertical pivoting motion of said bell crank means about said body.

7. The wheel suspension of claim 6 wherein said strut means is rotatable with respect to said collar means to permit the former to turn for steering of said vehicle.

8. The wheel suspension of claim 6 wherein said joining means comprises a predominantly vertically extending link having one end pivotally connected to said body and the other end pivotally connected to the free end of said second arm of said bell crank means.

* * * * *